Jan. 11, 1927. 1,614,370
J. KUBICEK
CLUTCH FOR POWER TRANSMISSION
Filed April 2, 1926
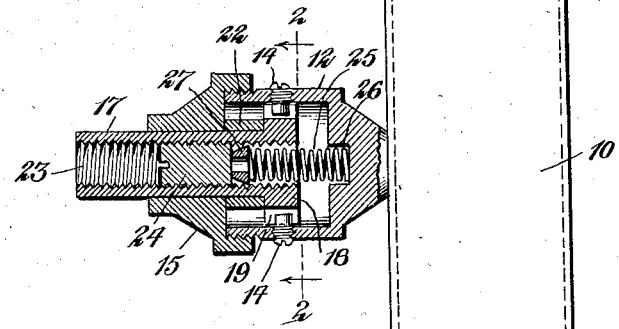
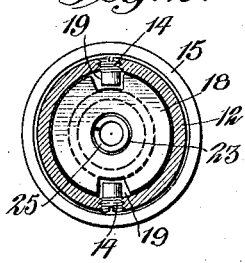 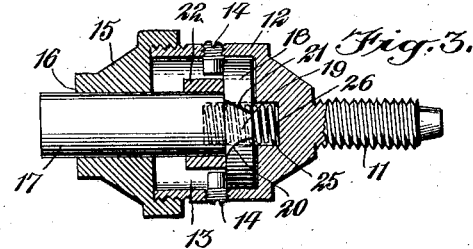
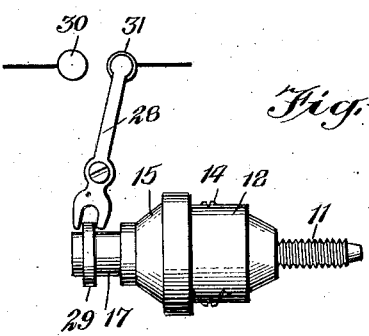
WITNESSES
INVENTOR
John Kubicek
BY
ATTORNEYS Patented Jan. 11, 1927.

1,614,370

UNITED STATES PATENT OFFICE.

JOHN KUBICEK, OF YONKERS, NEW YORK.

CLUTCH FOR POWER TRANSMISSION.

Application filed April 2, 1926. Serial No. 99,348.

This invention relates to a slip clutch for the transmission of power.

An object of the invention is to provide a simple economically constructed and assembled mechanism whereby in the driving of one element by another a clutch disposed therebetween will slip when more than a predetermined amount of resistance is offered by the driven element or when more than a given amount of power is applied by the driving element.

A further object resides in the provision of means whereby the parts are few in number, economical to manufacture, simple to assemble and disassemble and very little liable to wear unduly.

The invention is illustrated in the drawings, of which—

Figure 1 is a vertical, longitudinal section through the clutch showing the device attached to a casing containing a spring motor which is to be wound up;

Figure 2 is a section on the line 2—2 of Figure 1;

Figure 3 is a vertical longitudinal section taken through the device showing the parts in position in which the clutch is disengaged;

Figure 4 is a side elevation of the device showing it connected to a switch controlling an electrical circuit.

The form of the invention shown in the drawings is a preferred form, although it is understood that modifications in the construction and arrangement of the parts and in the character of the materials used may be adopted without departing from the spirit of the invention as set forth in the appended claims.

In its general aspect the invention comprises a driving element and a driven element. One of said elements is provided with a hollow chamber into which project a plurality of pins adapted to engage with portions of the other element. The other element is generally in the form of a disk provided with slots having inclined walls in which slots the above mentioned pins lie. As one element is rotated it will, through the engagement of the pins and the slots, drive the other element. A spring or similar member is disposed between the two elements and is adjusted to hold them in normal position wherein the pins and slots engage. When, however, an undue amount of power is applied or an undue amount of resistance is encountered, this power or resistance will cause the pins and the slots to move relatively to each other and become disengaged, causing a relative movement between the driving and the driven members. This relative movement will cause a compression of the spring, which as soon as the unbalance of power or resistance is removed will cause the parts to move back into their operative normal relation.

A further idea involved in the invention is to connect the circuit controlling switch with one of said elements so that as the relative movement takes place and the clutch is disengaged, the driving motor energized through said circuit will be cut out so any other circuit condition may thus be controlled through the intermediary of said switch.

In the preferred form of the invention shown in the drawings I show a casing 10 within which is disposed a spring motor, not shown. The purpose of the invention as thus shown is to wind up the spring motor. A shaft 11 extends into the casing and is connected to the spring motor. This shaft has on its outer end a cup-shaped member 12 having a chamber 13 therein. A plurality of pins 14 are mounted in the walls of the chamber preferably by being threadably engaged therein and depend into the chamber 13. The outer end of the chamber is threaded to receive a cap 15 having a bore 16 which acts as a seat or bearing for a driving shaft 17, which extends into the chamber 13. The end of the driving shaft is provided with a disk 18 which is provided on its periphery with a plurality of slots 19 having sloping walls such as 20 and 21. Back of the disk 18 and surrounding the shaft 17 is a spacing sleeve 22, which as shown in Figure 1, will hold the disk in the chamber 13 in such a position that the slots 19 will be in line with the pins 14, these pins being adapted to lie in said slots under the normal operation of the device, so that as the element 12 or shaft 17 is rotated the one will drive the other through the engagement of the pins and the slots.

The shaft 17 is provided with a threaded bore 23 in which the plug 24 is threadably and adjustably mounted. A spring 25 is disposed at one end in a recess 26 in the element 12 and at the other end extends into the bore 23. This end of the spring 25 bears against a piece of metal 27, preferably brass, which is loosely disposed between the spring and the plug 24 so as to reduce the friction between the spring and the plug.

In the normal operation of the device with the parts shown as in Figure 1, rotation of either the casing 12 or the shaft 17 will cause the engagement of the pins and slots, which will effect the transmission of power. Assuming that the shaft 17 is driving and the casing 12 is being driven, when the spring motor is sufficiently wound up it will offer resistance to further movement and this resistance will be transmitted to the pins 14. This resistance, therefore, will eventually become strong enough to cause the pins to slide along the sloping walls of the slots and force the disk 18 forward to the position shown in Figure 3 against the pressure of spring 25, which will be compressed. Therefore in this latter position further movement of the shaft 17 will not effect any movement of casing 12. As the disk is rotated, however, and the slots become alined successfully with the pins, the spring will tend to force the shaft and the disk back to normal position, but this tendency will be overcome as long as the resistance offered by the driven motor or the driven object is above the predetermined value. When this resistance gets below a predetermined value, which is measured by the amount of normal compression of the spring 25, then re-engagement will take place.

In some instances it is desirable to connect a switch 28 to a collar 29 on the shaft 17. This switch, swingable between contacts 30 and 31, is connected to suitable circuit wires for the purpose of altering the condition of the circuit, which may contain a driving motor connected to the shaft 17 and also may contain other apparatus to be controlled in accordance with the condition of the clutching element.

It will be obvious, therefore, that this device is extremely simple, efficient, composed of a minimum number of parts, which are easily assembled and disassembled for adjustment and repair.

I claim:

1. A clutch for transmission of power which comprises a driving and a driven member shiftable relatively to one another, radial pins fixed to one member, sloping-walled slots on the other members whose slope is in the direction of shifting movement of said member, said pins and slots normally engaging, said pins and slots forming the only connection for the transmission of power between said members, and means tending to hold said members in their normal position.

2. A clutch for transmission of power which comprises a disk having sloping-walled slots in its periphery, a plurality of pins normally projecting radially within said slots, a member housing said disk and supporting said pins, a member supporting said disk in shiftable relation to the other of said members, means for normally holding the pins and slots in operative relation and means for adjusting said last named means.

3. A clutch for transmission of power which comprises a disk having sloping-walled slots in its periphery a plurality of pins normally projecting radially of the disk and within said slots, a member supporting said pins, a member supporting said disk and movable relatively to the other of said members in the direction of slope of said slots, and means engaging the disk tending to hold it in operative normal relation with the pins, said pin supporting member housing and protecting said disk.

4. A clutch for transmission of power which comprises a hollow shaft, a disk thereon, having sloping walled slots on its periphery, said shaft having a threaded bore, a plug adjustably mounted in the bore, a spring having one end associated with the plug, a support against which the other end of the spring bears, and pins associated with said support and normally disposed in said slots.

5. A clutch for transmission of power which comprises a driving member, a driven member, a cup-shaped casing on one member, pins in the walls of the casing and dependent into the cup, a disk on the other member and lying slidably in the cup, said disk having sloping wall slots in which the pins normally lie and means tending to hold them in this normal relation.

6. A clutch for transmission of power which comprises a shaft, a cup-shaped casing on the end of the shaft, adjustable pins in the walls of the casing and dependent into the cup, a second shaft extending into the open end of the cup, a disk on the end of the second shaft, said disk having sloping-walled slots in its periphery, in which the pins normally lie, a cap on the casing acting as a bearing for the second shaft, a spring extending between the bottom of the cup and the second shaft to hold the desk and the pins in normal operative relation.

JOHN KUBICEK.